Jan. 27, 1970     K. G. OLSSON ET AL     3,491,980

MOLDS FOR CELLULAR CONCRETE BODIES

Filed April 19, 1967

United States Patent Office 3,491,980
Patented Jan. 27, 1970

3,491,980
MOLDS FOR CELLULAR CONCRETE BODIES
Karl Gustav Olsson, Solna, and Rolf Erik Goransson, Handen, Sweden, assignor to Internationella Siporex Aktiebolaget, Stockholm, Sweden, a Swedish joint-stock company
Continuation-in-part of application Ser. No. 416,272, Dec. 7, 1964. This application Apr. 19, 1967, Ser. No. 632,065
Claims priority, application Sweden, Aug. 3, 1966, 10,531/66
Int. Cl. B41b 11/60
U.S. Cl. 249—167                    7 Claims

ABSTRACT OF THE DISCLOSURE

A transporting mold comprising a rigid, tapering mold frame and a plurality of separate elongate bottom sections releasably retained under the mold frame by positioning pins and movable hooks on two opposite wall members of the frame, the hooks being actuatable in groups. The mold frame itself having wheels not obstructing the lifting away of the frame from the bottom sections, when the latter are rested on a suitable support and released.

---

Figure 1:
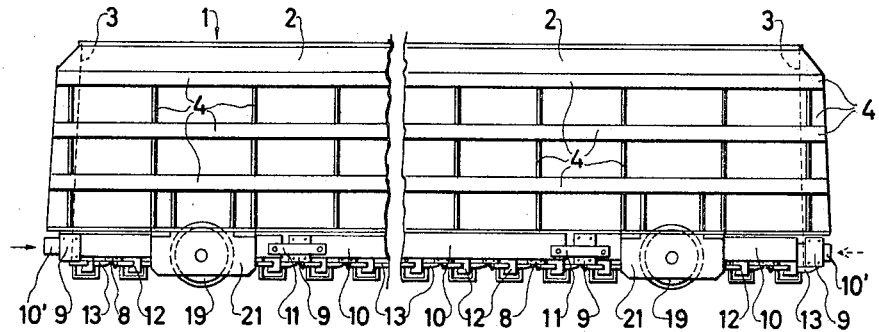

This application is a continuation-in-part of our previous U.S. patent application, Ser. No. 416,272, filed Dec. 7, 1964, now abandoned.

This invention relates to molds for casting and transporting such large bodies of cellular light weight concrete which are to be cut up into smaller pieces, e.g. slabs or blocks, when the light weight concrete mass has set sufficiently after casting, and possible expansion, to become selfsupporting. Such bodies are commonly of a considerable size and weight, say 5 x 6 x 20 feet and about 10 tons, and have to be handled with care, because the set cellular concrete mass is very fragile, until it has finally been steam-hardened.

More particularly the invention is concerned with molds of the type comprising in combination a rectangular mold frame forming the side and end walls of the open molding space, and a mold bottom composed of a plurality of separate, elongate bottom sections extending in parallel relationship between two opposite wall members of the mold frame, said latter wall members having, at their lower marginal portions, means for releasably retaining said plurality of bottom sections between them, when the mold is in use.

The use of a mold bottom construction of the type just referred to is caused by the desire to make possible a cutting up of the cellular light weight concrete body without transferring the same from the mold bottom, on which it has been cast, to another bearing surface since such a transfer may involve considerable risks for damaging the large body. The cutting operation may advantageously be accomplished in an apparatus of the type disclosed in the U.S. Patent No. 2,694,846 granted to us, but this is not entirely necessary, particularly not if it is sufficient to cut the body vertically in one single direction only and along lines coinciding with the slits between some or all of the mold bottom sections.

Up to now the molds of the type referred to hereinbefore have been provided with a mold frame requiring a complete taking apart or at least an expansion for being removed from the cast body and having separatable wall members held together by special tightening locks or clamps. Furthermore the ends of the mold bottom sections were retained in grooves or recesses in the inner surfaces of the two opposite wall members so that a taking apart or at least an expansion of the mold frame was unavoidable for releasing them. This has been found unsatisfactory from several points of view. The opening and re-tightening of the locks or clamps is a time-consuming task. It is difficult to obtain the required tightness and the correct relative positions between the different wall members and to maintain those relative positions when the mold is handled and transported during the cellular concrete manufacturing process. Even a slight distortion of the mold frame can, in fact, easily damage the entire body cast in the mold and, therefore, expensive measures were necessary to prevent such distortion. In addition, the removal of the mutually separated or spread apart wall members of the mold frame from the cast and set body was a delicate task requiring particular care and plurlity of special mechanical aids to prevent the large and heavy wall members from uncontrolled movements which could easily spoil the body, and the attachment of the bottom sections in the grooves or recesses of the wall members was difficult and limited the possibilities to effectively seal the slits between the bottom sections as well as the crevices between the bottom sections and the wall members. Furthermore, each separate wall member of the mold frame had to be constructed as a selfsupporting rigid unit which made it extra heavy and expensive and, because of a required complicated box beam structure, rather liable to decay by internal rusting and corrosion, which was difficult to control and prevent.

It is the main object of this invention to provide a mold for large cellular concrete bodies of the type referred to in which the abovementioned inconveniences are effectively eliminated and which by its improved construction and way of functioning lends itself for a more advanced, work- and time-saving operating system in the cellular concrete manufacturing plant. It is also an object of the invention to provide an improved mold structure that in spite of its large size is relatively light, very sturdy and, hence, easy to handle. A further object of the invention is to provide a mold which in addition to other advantages is capable of moving on its own wheels between different stations in the cellular concrete manufacturing plant.

Figure 2:
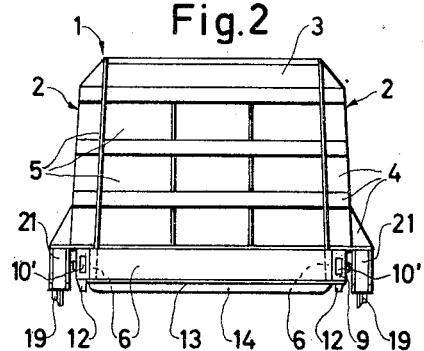
Figure 3:
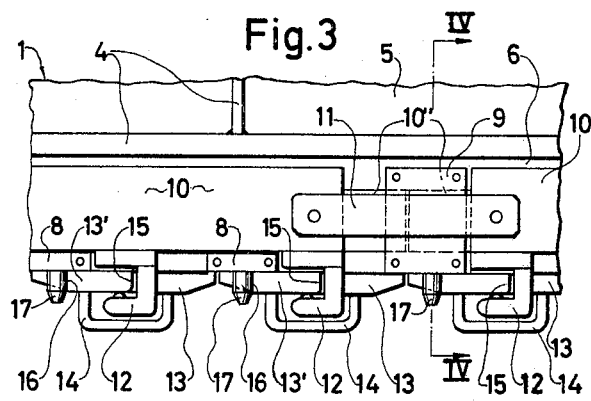
Figure 4:
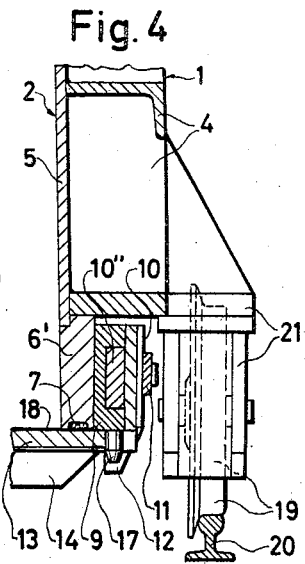
Figure 5:
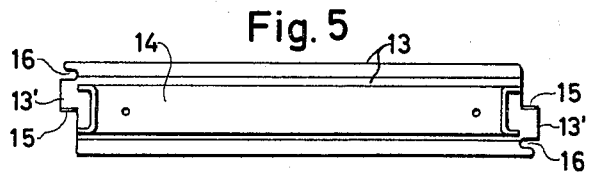

Further objects and features of the mold according to this invention will appear from the following description of a preferred form thereof which has been illustrated in the accompanying drawing, wherein FIG. 1 is a shortened side view of the mold,
FIG. 2 is an end view of the same,
FIG. 3 is a partial side view of the lower part of the mold at an enlarged scale showing the means for releasably retaining the bottom sections,
FIG. 4 is a partial sectional elevation taken along the line IV—IV in FIG. 3, and
FIG. 5 is a plan view of a single mold bottom section as seen from below and at approximately half the scale of FIGS. 3 and 4.

The mold shown in the drawing comprises a rectangular mold frame, generally indicated by numeral 1 and presenting two longitudinal side wall members 2 and two end wall members 3 jointed together to form a rigid, unitary structure. The inner surfaces of all the wall members 2 and 3 are smooth and slightly inclined towards the interior of the mold frame so as to provide a sufficient clearance to permit lifting away of the mold frame from the cellular light weight concrete body cast therein, when said body has been positioned on a suitable support as will be more closely described in the following. It is preferred, as shown, to build up the wall members of the mold frame as exteriorly open frameworks 4 of crossing flat and angle bars covered on its inside only by plate 5, whereby enclosed spaces, in which uncontrolled rusting and corrosion can take place, are avoided.

The lower marginal portion of each wall member 2 and 3, respectively, is formed by a thicker bar 6 having a level bottom face in which there may, if desired, be formed a groove for positioning an elastic sealing strip 7, e.g. of sponge rubber, and an inclined inner face 6' forming a direct extension of the inside of the related wall plate 5. To the outer face of the lower bar 6 of each longitudinal side wall member 2 there are secured, such as by bolts or welding, a number of brackets 8 and bearings 9 serving as supporting means for a series of interconnected rails 10 movable a short distance in the longitudinal direction of the mold.

Each bracket 8 forms a supporting shelf for the related rail 10 while each bearing 9 is formed to surround constricted end extensions 10', 10" of the rails 10 to thereby keep the rails in place and permit a limited longitudinal movement of the same. More in detail each outermost rail 10 on each side wall member 2 has at its outer end a relatively long constricted end extension 10' passing entirely through its related bearing 9 to present an exposed end free for actuation in order to move the entire series of rails, while all the other rail end extensions 10" are shorter so as to terminate within the related bearing 9, the latter then receiving and guiding two opposed end extensions 10" of adjacent rails 10 as clearly illustrated in FIG. 3. Adjacent rails 10 are also interconnected by external links 11 to move longitudinally in synchronism when actuated e.g. by pushing, or pulling, one of the outer end portions 10'.

Each rail 10 has secured to its bottom side a number, say five as shown, of hooks 12 evenly distributed along the length thereof and serving to engage with the end of each one related bottom section 13 of the mold. As may been seen particularly from FIG. 5, each bottom section 13 is in the form of an elongated plate having bevelled longitudinal edge portions and a stiffening central channel 14 on its bottom side. At each end the bottom section 13 has a projecting end portion 13' extending over approximately half its width and forming a gripping edge 15 for the related hook 12. Each projecting end portion 13' also has an incut 16 adapted to receive a positioning pin 17 projecting from the bottom side of each bracket 8 and bearing 9, respectively, and preventing the bottom section 13 from being displaced when the related hook 12 is moved into or out of engagement with the gripping edge 15 thereof. In some cases it may be advantageous to replace the incuts 16 by holes whereby some or all of the bottom sections may assist in holding together the side walls of the mold frame, particularly if these side walls are of considerable length.

It will be readily understood that, if the required number of bottom sections 13 are properly positioned on a suitable support, such as an elevatable bed or table, and the mold frame 1 is lowered vertically on to them, such as by means of a travelling crane or other suitable hoisting equipment, the pins 17 on the mold frame will enter the corresponding incuts 16 in all the bottom sections 13 and by then actuating the rails 10 on both sides of the mold frame so that the hooks 12 are moved into supporting engagement with the related gripping edges 15 all the bottom sections 13 will in a simple manner be securely locked to the mold frame 1. On the other hand, if the mold with its bottom sections locked to the mold frame arrives to a station where a suitable support, such as an elevteable cutting bed, is adapted to receive the mold bottom sections 13 with the properly set cellular concrete body resting thereon, the bottom sections can, by actuation of the rails 10, easily be released from the mold frame 1 to permit lifting away of said frame for full exposition of the cellular concrete body so that the latter may conveniently be cut or otherwise treated.

Since the light weight concrete mass to be cast in the mold is ordinarily rather fluent before having expanded by internally created gas bubbles, it may be convenient to cover the bottom section 13 with a continuous sheet 18 of plastic or the like before the mold frame 1 is lowered onto them. Such a sheet 18 will effectively seal the slits between the bottom sections 13 and may either be cut through when or removed before the cutting of the set cellular concrete body is carried out. However, the use of such a sealing sheet is an arbitrary measure and other slit sealing means may, of course, be resorted to, if at all considered desirable.

In order to avoid the necessity of using travelling cranes or other movable lifting devices for transporting the complete mold, or the mold frame itself, between different stations in the manufacturing plant, the mold frame 1 may advantageously be provided with its own wheels 19, e.g. adapted to run on track rails such as indicated at 20 in FIG. 4. These wheels 19, of which there are two on each longitudinal side wall of the mold frame 1, are each journalled in its own bracket structure 21 rigidly secured to the outside of the related wall member 2 in such a manner that neither the bracket structure nor the wheel itself or its stub shaft will interfere with the rail and hook mechanism 10–12 or the mold bottom sections 13. Thus it is important that the wheels 19 are located completely outwardly beyond the area covered by the complete series of bottom sections so as not to obstruct the lifting away of the mold frame from the released bottom sections and from the cellular concrete body resting thereon.

Obviously these wheels will be able to carry the complete mold with the cast cellular concrete body contained therein between e.g. a casting station, where the mold is filled, through a conditioning tunnel, wherein the mold contents is caused to expand and set, and to a cutting station, where the mold bottom sections are released from the mold frame and the latter is lifted away in order to expose the semiplastic cellular concrete body for cutting such as in a cutting apparatus of the type disclosed in our U.S. Patent No. 2,694,846 referred to hereinbefore. When the cutting operation is accomplished, the mold frame may be replaced and locked together with the bottom sections so that the complete mold may again be used for transporting the cut body into a steam-hardening autoclave and further, if desired. Alternatively, the mold frame itself may be returned to an assembly station, where another series of bottom sections is attached and locked to it, while the original bottom sections with the cut body resting thereon may be transported into the autoclave by other suitable transporting means.

It should be readily understood that the mold frame may be square, i.e. have wall members of uniform length, if so desired, and the bottom sections may extend between any pair of opposite wall members. Furthermore, the wheels, if provided, may be mounted on another pair of opposite wall members than those between which the bottom sections extend, if this is more convenient in view of the relative locations of the different stations, such as the casting and cutting stations in the manufacturing plant, the important thing being still that the wheels and their mounting means do not obstruct the lifting away of the mold frame from the bottom sections when the latter have been rested on a suitable support and released.

What is claimed is:

1. A mold for casting and transporting large bodies of cellular light weight concrete and of the type comprising in combination a rectangular mold frame forming the side and end walls of the molding space and a mold bottom composed of a plurality of separate, elongate bottom sections extending in parallel relationship between two opposite wall members of the mold frame, said latter wall members having, at their lower marginal portions, means for releasably retaining said plurality of bottom sections between them, when the mold is in use, wherein said mold frame is formed as a unitary, rigid frame structure having inwardly inclined smooth inner wall surfaces and wherein said means for releasably retaining the bottom sections comprise catching devices movably mounted on said opposite wall members for engaging and disengaging the ends of said releasable mold bottom sections, said catching devices being movable between operative and inoperative position through actuating means common to at least a group of said catching devices on each wall member of the mold frame.

2. A mold according to claim 1, wherein said opposite wall members of the mold frame are provided with positioning means projecting downwardly from the lower edges thereof and adapted to engage the end portions of said releasable mold bottom sections for defining their proper positions relatively to the mold frame.

3. A mold according to claim 1, wherein said catching devices are hooks movable in the longitudinal direction of said opposite wall members of the mold frame and adapted to grip a projecting end portion on each one related mold bottom section.

4. A mold according to claim 3, wherein groups of said hooks are secured to common carriers forming part of said actuating means for the catching devices and being movably mounted on the related wall member of the mold frame.

5. A mold according to claim 4, wherein said carriers on each wall member are interconnected to move in synchronism a limited stroke upon actuation of one of said interconnected carriers.

6. A mold according to claim 5, wherein each carrier is a rail movably supported by brackets on the related wall member of the mold frame and having end extensions guided in bearings on said wall member.

7. A mold according to claim 1 wherein said unitary mold frame has at least two wheels mounted on each of two opposite wall members, each of said wheels being mounted completely outwardly beyond the area covered by said bottom sections so that neither any wheel nor its mounting means obstructs the lifting away of the mold frame from said bottom sections when the latter are released by said catching devices.

References Cited

UNITED STATES PATENTS

| | | | |
|---|---|---|---|
| 1,771,110 | 7/1930 | Bachmann | 249—169 X |
| 2,569,469 | 10/1951 | Gersten et al. | 249—169 X |
| 2,694,846 | 11/1954 | Olsson et al. | 25—113 X |
| 3,204,315 | 9/1965 | Akerfors | 25—105 |

FOREIGN PATENTS

| | | |
|---|---|---|
| 127,668 | 3/1950 | Sweden. |
| 790,881 | 2/1958 | Great Britain. |

J. SPENCER OVERHOLSER, Primary Examiner

U.S. Cl. X.R.

249—169